(12) United States Patent
Lupu et al.

(10) Patent No.: US 11,528,836 B2
(45) Date of Patent: Dec. 20, 2022

(54) SYSTEM AND METHOD FOR SEQUENTIALLY CONTROLLING AGRICULTURAL IMPLEMENT GROUND-ENGAGING TOOLS

(71) Applicant: CNH Industrial America LLC, New Holland, PA (US)

(72) Inventors: Mircea F. Lupu, Pittsburgh, PA (US); Thamer Z. Alharbi, Naperville, IL (US); Andrew Wilson, Allison Park, PA (US); Michael R. Cozza, Pittsburgh, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 449 days.

(21) Appl. No.: 16/692,229

(22) Filed: Nov. 22, 2019

(65) Prior Publication Data
US 2021/0153418 A1 May 27, 2021

(51) Int. Cl.
*A01B 63/28* (2006.01)
*A01B 79/00* (2006.01)
(Continued)

(52) U.S. Cl.
CPC .......... *A01B 63/28* (2013.01); *A01B 63/002* (2013.01); *A01B 71/02* (2013.01); *A01B 79/005* (2013.01); *A01B 7/00* (2013.01)

(58) Field of Classification Search
CPC ......... A01B 63/28; A01B 7/00; A01B 63/002; A01B 71/02; A01B 79/005; A01B 63/24;
(Continued)

(56) References Cited

U.S. PATENT DOCUMENTS 5,462,123 A 10/1995 Harlan et al.
5,915,481 A 6/1999 Flenker et al.
(Continued)

FOREIGN PATENT DOCUMENTS

CN 106612813 5/2017
CN 107231912 10/2017
(Continued)

OTHER PUBLICATIONS

"New Holland NHDrive™ Concept Autonomous Tractor Based on Current Production New Holland T8 Auto Command Tractor" CNH Industrial, New Holland Agriculture, Jul. 30, 2019, 2 pages.

*Primary Examiner* — Christopher J. Novosad
(74) *Attorney, Agent, or Firm* — Rebecca Henkel; Rickard Demille

(57) ABSTRACT

In one aspect, a system for controlling ground-engaging tools of an agricultural implement may include first and second ground-engaging tools configured to perform first and second operations, respectively, on a field as the agricultural implement is moved across the field. Furthermore, a controller of the disclosed system may be configured to determine a first value of a field characteristic based on the received sensor data and adjust an operating parameter of the first ground-engaging tool based on the determined first value. After adjusting the operating parameter of the first ground-engaging tool, the controller may be configured to determine a second value of the field characteristic based on the sensor data and adjust an operating parameter of the second ground-engaging tool based on the determined second value.

18 Claims, 4 Drawing Sheets

(51) Int. Cl.
  *A01B 63/00* (2006.01)
  *A01B 71/02* (2006.01)
  *A01B 7/00* (2006.01)
(58) Field of Classification Search
  CPC ......... A01B 63/14; A01B 63/00; A01B 71/00; A01B 79/00
  See application file for complete search history.

(56) References Cited

U.S. PATENT DOCUMENTS

| | | |
|---|---|---|
| 5,961,573 A | 10/1999 | Hale et al. |
| 8,827,001 B2 | 9/2014 | Wendte et al. |
| 8,862,339 B2 | 10/2014 | Henry et al. |
| 9,485,900 B2 | 11/2016 | Connell et al. |
| 9,516,802 B2 | 12/2016 | Zemenchik |
| 9,554,098 B2 | 1/2017 | Casper et al. |
| 9,668,420 B2 | 6/2017 | Anderson et al. |
| 9,801,329 B2 | 10/2017 | Zielke |
| 9,826,677 B2 | 11/2017 | Gervais et al. |
| 9,883,626 B2 | 2/2018 | Heim et al. |
| 9,968,025 B2 | 5/2018 | Bunderson et al. |
| 10,023,193 B2 | 7/2018 | Heindl et al. |
| 10,085,372 B2 | 10/2018 | Noyer et al. |
| 10,123,475 B2 | 11/2018 | Posselius et al. |
| 10,262,206 B2 | 4/2019 | Posselius |
| 2002/0133505 A1 | 9/2002 | Hideki |
| 2017/0112043 A1 | 4/2017 | Nair et al. |
| 2017/0127606 A1 | 5/2017 | Horton |
| 2018/0206393 A1 | 7/2018 | Stoller et al. |
| 2018/0352718 A1 | 12/2018 | Kovach et al. |
| 2019/0104675 A1 | 4/2019 | Shinkai |

FOREIGN PATENT DOCUMENTS

| | | | | |
|---|---|---|---|---|
| CN | 104247606 B | * | 10/2018 | ........... A01D 34/008 |
| EP | 3235359 | | 10/2017 | |
| WO | WO-2015046187 A1 | * | 4/2015 | ............. A01D 41/12 |
| WO | WO2017049186 | | 3/2017 | |
| WO | WO2017214554 | | 12/2017 | |
| WO | WO2019079205 | | 4/2019 | |

* cited by examiner

SYSTEM AND METHOD FOR SEQUENTIALLY CONTROLLING AGRICULTURAL IMPLEMENT GROUND-ENGAGING TOOLS

FIELD OF THE INVENTION

The present disclosure generally relates to agricultural implements and, more particularly, to systems and methods for sequentially controlling a plurality of ground-engaging tools of an agricultural implement.

BACKGROUND OF THE INVENTION

It is well known that, to attain the best agricultural performance from a piece of land, a farmer must cultivate the soil, typically through one or more tillage operations. Common tillage operations include plowing, harrowing, and sub-soiling. Modern farmers perform these tillage operations by pulling a tillage implement behind an agricultural work vehicle, such as a tractor. Depending on the crop selection and the soil conditions, a farmer may need to perform several tillage operations at different times over a crop cycle to properly cultivate the land to suit the crop choice.

When performing tillage operations, it is desirable to create a level and uniform layer of tilled soil across the field to form a proper seedbed for subsequent planting operations. As such, it may be necessary to adjust the operation of the agricultural implement as soil conditions vary across the field. In this respect, systems have been developed to automatically adjust an operating parameter of the agricultural implement based on a change in a field condition. However, further improvements to such systems are needed.

Accordingly, an improved system and method for controlling the ground-engaging tools of an agricultural implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling ground-engaging tools of an agricultural implement. The system may include a first ground-engaging tool configured to perform a first operation on a field as the agricultural implement is moved across the field. Furthermore, the system may include a second ground-engaging tool configured to perform a second operation on the field as the agricultural implement is moved across the field. Additionally, the system may include a sensor configured to capture data indicative of a field characteristic of the field. Moreover, the system may include a controller communicatively coupled to the sensor. As such, the controller may be configured to determine a first value of the field characteristic based on the data captured by the sensor and adjust an operating parameter of the first ground-engaging tool based on the determined first value. After adjusting the operating parameter of the first ground-engaging tool, the controller may be configured to determine a second value of the field characteristic based on the data captured by the sensor and adjust an operating parameter of the second ground-engaging tool based on the determined second value.

In another aspect, the present subject matter is directed to a method for controlling ground-engaging tools of an agricultural implement. The agricultural implement may include a first ground-engaging tool configured to perform a first operation on a field as the agricultural implement is moved across the field. Furthermore, the agricultural implement may include a second ground-engaging tool configured to perform a second operation on the field as the agricultural implement is moved across the field. The method may include determining, with one or more computing devices, a first value of a field characteristic of the field based on received sensor data. Additionally, the method may include adjusting, with the one or more computing devices, an operating parameter of the first ground-engaging tool based on the determined first value. After adjusting the operating parameter of the first ground-engaging tool, the method may include determining, with the one or more computing devices, a second value of the field characteristic based on the received sensor data. Moreover, the method may include adjusting, with the one or more computing devices, an operating parameter of the second ground-engaging tool based on the determined second value.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
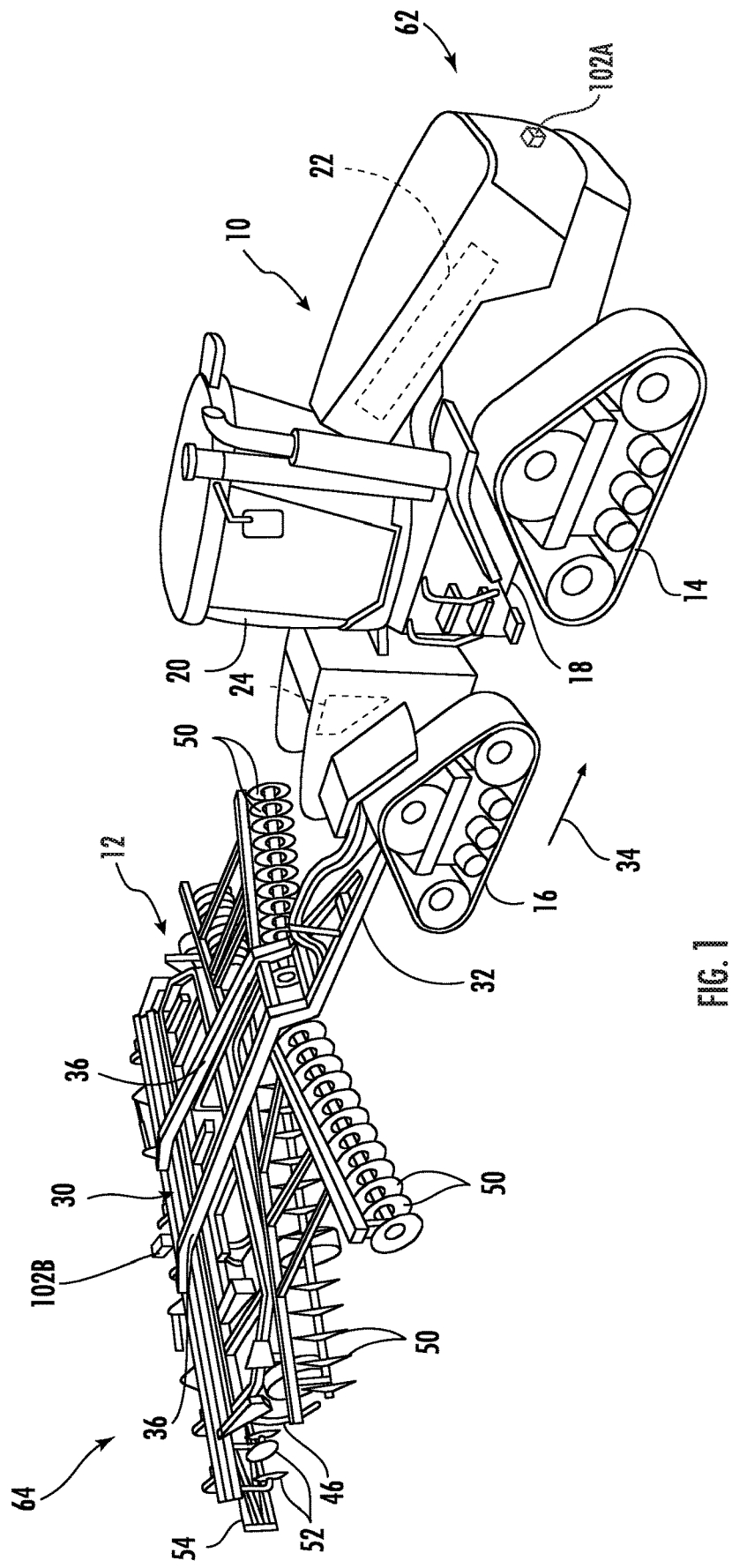
FIG. 1 illustrates a perspective view of one embodiment of a work vehicle towing an agricultural implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling the ground-engaging tools of an agricultural implement. Specifically, in several embodiments, the implement may include one or more first ground-engaging tools configured to perform a first operation on a field as a work vehicle tows the implement travels across the field. Furthermore, the implement may include one or more second ground-engaging tools configured to perform a second operation on the field as the work vehicle tows the implement travels across the field. For example, in one embodiment, the first ground-engaging tool(s) may correspond to a leveling blade(s) configured to level the soil in the field and the second ground-engaging tool(s) may correspond to a shank(s) configured to incorporate the soil.

In accordance with aspects of the present subject matter, a controller of the disclosed system may be configured to sequentially control the operation of the first and second ground-engaging tools. More specifically, the controller may be configured to determine a first value(s) of a field characteristic(s) (e.g., residue coverage, soil clod size, soil levelness, or compaction layer depth) of the field based on received sensor data. The controller may then be configured to adjust one or more operating parameters of the first ground-engaging tool(s) based on the determined first value(s) of the field characteristic(s). Such an adjustment(s) may impact the field characteristic(s) in a manner that requires further adjustment of the operation of the implement. In this respect, after adjusting the operating parameter(s) of the first ground-engaging tool(s), the controller may be configured to determine a second value(s) of the field characteristic(s) based on the received sensor data. Thereafter, the controller may be configured to adjust one or more operating parameters of the second ground-engaging tool(s) based on the determined second value(s) of the field characteristic(s).

Figure 2:
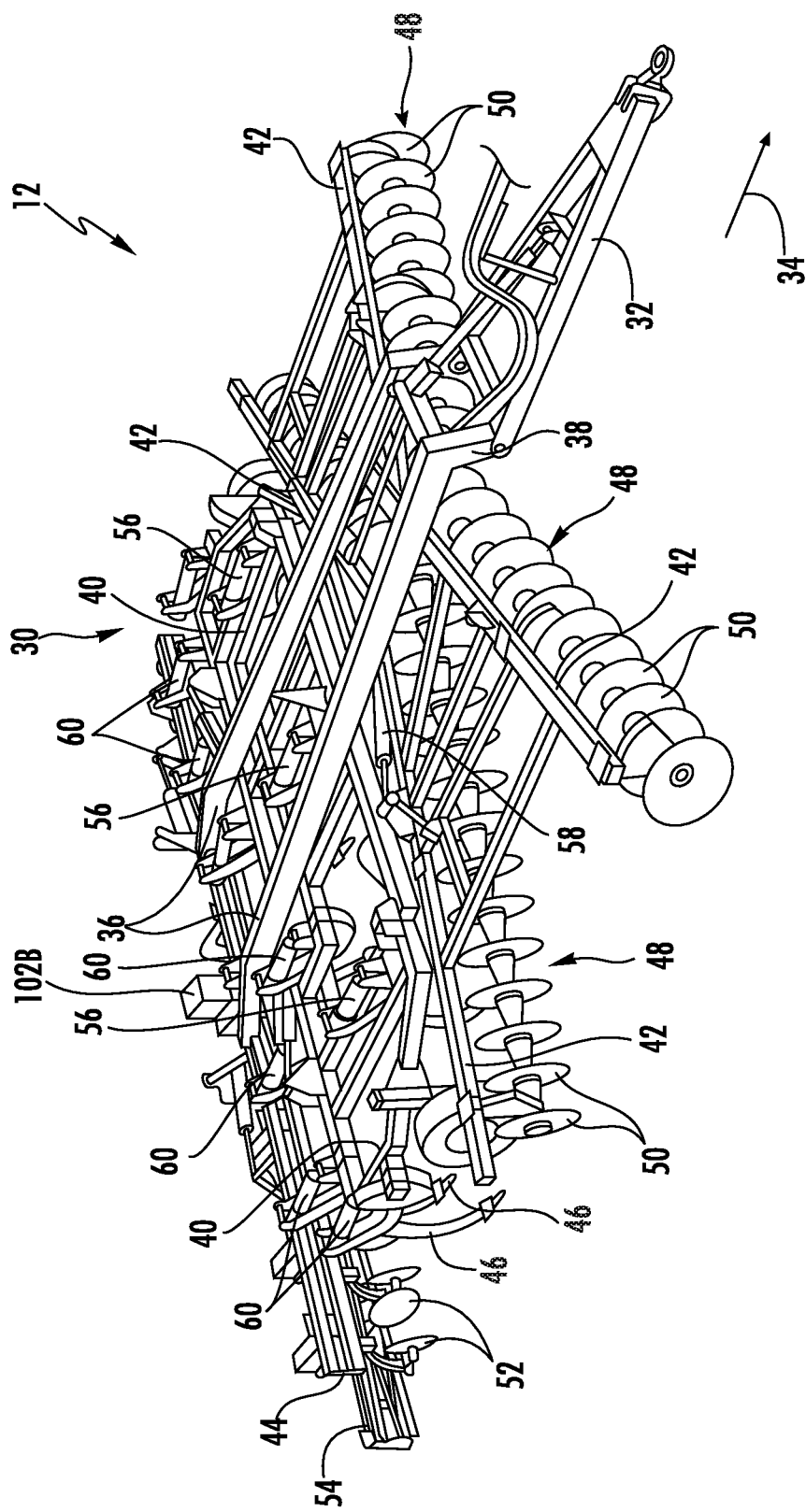
FIG. 2 illustrates a perspective view of the agricultural implement shown in FIG. 1.

Referring now to drawings, FIGS. 1 and 2 illustrate perspective views of one embodiment of a work vehicle 10 and an associated agricultural implement 12 in accordance with aspects of the present subject matter. Specifically, FIG. 1 illustrates a perspective view of the vehicle 10 towing the implement 12 (e.g., across a field). Additionally, FIG. 2 illustrates a perspective view of the implement 12 shown in FIG. 1. As shown in the illustrated embodiment, the vehicle 10 is configured as an agricultural tractor and the implement 12 is configured as a tillage implement. However, in other embodiments, the vehicle 10 may be configured as any other suitable agricultural vehicle. Furthermore, in alternative embodiments, the implement 12 may be configured as any other suitable agricultural implement.

As particularly shown in FIG. 1, the vehicle 10 includes a pair of front track assemblies 14 (one is shown), a pair of rear track assemblies 16 (one is shown), and a frame or chassis 18 coupled to and supported by the track assemblies 14, 16. An operator's cab 20 may be supported by a portion of the chassis 18 and may house various input devices for permitting an operator to control the operation of one or more components of the vehicle 10 and/or one or more components of the implement 12. Additionally, the vehicle 10 may include an engine 22 and a transmission 24 mounted on the chassis 18. The transmission 24 may be operably coupled to the engine 22 and may provide variably adjusted gear ratios for transferring engine power to the track assemblies 14, 16 via a drive axle assembly (not shown) (or via axles if multiple drive axles are employed).

Moreover, as shown in FIGS. 1 and 2, the implement 12 may generally include a carriage frame assembly 30 configured to be towed by the vehicle 10 via a pull hitch or tow bar 32 in a travel direction of the vehicle 10 (e.g., as indicated by arrow 34). In general, the carriage frame assembly 30 may be configured to support a plurality of ground-engaging tools, such as a plurality of shanks, disk blades, leveling blades, tines, basket assemblies, and/or the like. In several embodiments, the ground-engaging tools may be configured to perform various tillage operations (e.g., plowing, leveling, and/or the like) on the field along which the implement 12 is being towed.

As particularly shown in FIG. 2, the carriage frame assembly 30 may include aft-extending carrier frame members 36 coupled to the tow bar 32. In addition, reinforcing gusset plates 38 may be used to strengthen the connection between the tow bar 32 and the carrier frame members 36. In several embodiments, the carriage frame assembly 30 may generally support a central frame 40, a forward frame 42 positioned forward of the central frame 40 in the direction of travel 34, and an aft frame 44 positioned aft of the central frame 40 in the direction of travel 34. As shown in FIG. 2, in one embodiment, the central frame 40 may correspond to a shank frame configured to support a plurality of ground-engaging shanks 46 configured to mix or incorporate the soil as the implement 12 is towed across the field. However, in other embodiments, the central frame 40 may be configured to support any other suitable ground-engaging tools.

Additionally, as shown in FIG. 2, in one embodiment, the forward frame 42 may correspond to a disk frame configured to support various gangs or sets 48 of disk blades 50. In such an embodiment, each disk blade 50 may, for example, include both a concave side (not shown) and a convex side (not shown). In addition, the various gangs 48 of disk blades 50 may be oriented at an angle relative to the travel direction 34 of the work vehicle 10. As such, the disk blades 50 may chop up residue, weeds, and other plant matter and incorporate such plant matter into the soil. However, in other embodiments, the forward frame 42 may be configured to support any other suitable ground-engaging tools.

Moreover, like the central and forward frames 40, 42, the aft frame 44 may also be configured to support a plurality of ground-engaging tools. For instance, in the illustrated embodiment, the aft frame 44 is configured to support a plurality of leveling blades 52 and rolling (or crumbler) basket assemblies 54 positioned aft of the shanks 46. In such an embodiment, the leveling blades 52 may be configured to level ridges formed in the soil by the shanks 46. Moreover, the basket assemblies 54 may be configured to break up soil clods present on the surface of the field. However, in other embodiments, any other suitable ground-engaging tools may be coupled to and supported by the aft frame 44, such as a plurality closing disks.

In addition, the implement 12 may also include any number of suitable actuators (e.g., hydraulic cylinders) for adjusting the relative positioning of, penetration depth of, and/or force applied to the various ground-engaging tools 46, 50, 52, 54. For instance, the implement 12 may include one or more first actuators 56 coupled to the central frame 40 for raising or lowering the central frame 40 relative to the ground, thereby allowing adjustment of the penetration depth of and/or the forced applied to the shanks 46. Similarly, the implement 12 may include one or more second actuators 58 coupled to the disk forward frame 42 to adjust the penetration depth of and/or the force applied to the disk blades 50. Moreover, the implement 12 may include one or more third actuators 60 coupled to the aft frame 44 to allow the aft frame 44 to be moved relative to the central frame 40, thereby allowing the relevant operating parameters of the ground-engaging tools 52, 54 supported by the aft frame 44 (e.g., the force applied to and/or the penetration depth of) to be adjusted.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine, transmission, and drive axle assembly are coupled, a configuration common in smaller tractors. Still other configurations may use an articulated chassis to steer the work vehicle 10 or rely on tires/wheels in lieu of the track assemblies 14, 16.

It should also be appreciated that the configuration of the implement 12 described above and shown in FIGS. 1 and 2 is only provided for exemplary purposes. Thus, it should be appreciated that the present subject matter may be readily adaptable to any manner of implement configuration. For example, as indicated above, each frame section of the implement 12 may be configured to support any suitable type of ground-engaging tools, such as by installing closing disks on the aft frame 44 of the implement 12.

In accordance with aspects of the present subject matter, the vehicle/implement 10/12 may include one or more field characteristic sensors coupled thereto and/or mounted thereon. As will be described below, each field characteristic sensor may be configured to capture data associated with a portion of the field across which the vehicle/implement 10/12 is traveling. The captured data may, in turn, be indicative of one or more field characteristic of the field, such as the residue coverage, soil clod size, soil levelness, and/or compaction layer location. As such, in several embodiments, the field characteristic sensor(s) may be provided in operative association with the vehicle/implement 10/12 such that the sensor(s) has an associated field(s) of view or sensor detection range(s) directed towards a portion(s) of the field adjacent to the vehicle/implement 10/12. For example, as shown in FIG. 1, in one embodiment, one field characteristic sensor 102A may be mounted on a forward end 62 of the work vehicle 10 to capture field characteristic data associated with a section of the field disposed in front of the vehicle 10 relative to the direction of travel 34. Similarly, as shown in FIGS. 1 and 2, a second field characteristic sensor 102B may be mounted on an aft end 64 of the implement 12 to capture field characteristic data associated with a section of the field disposed behind the implement 12 relative to the direction of travel 34. However, in alternative embodiments, the field characteristic sensors 102A, 102B may be installed at any other suitable location(s) on the vehicle/implement 10/12. Additionally, in some embodiments, the vehicle/implement 10/12 may include only one field characteristic sensor or three or more field characteristic sensors.

Figure 3:
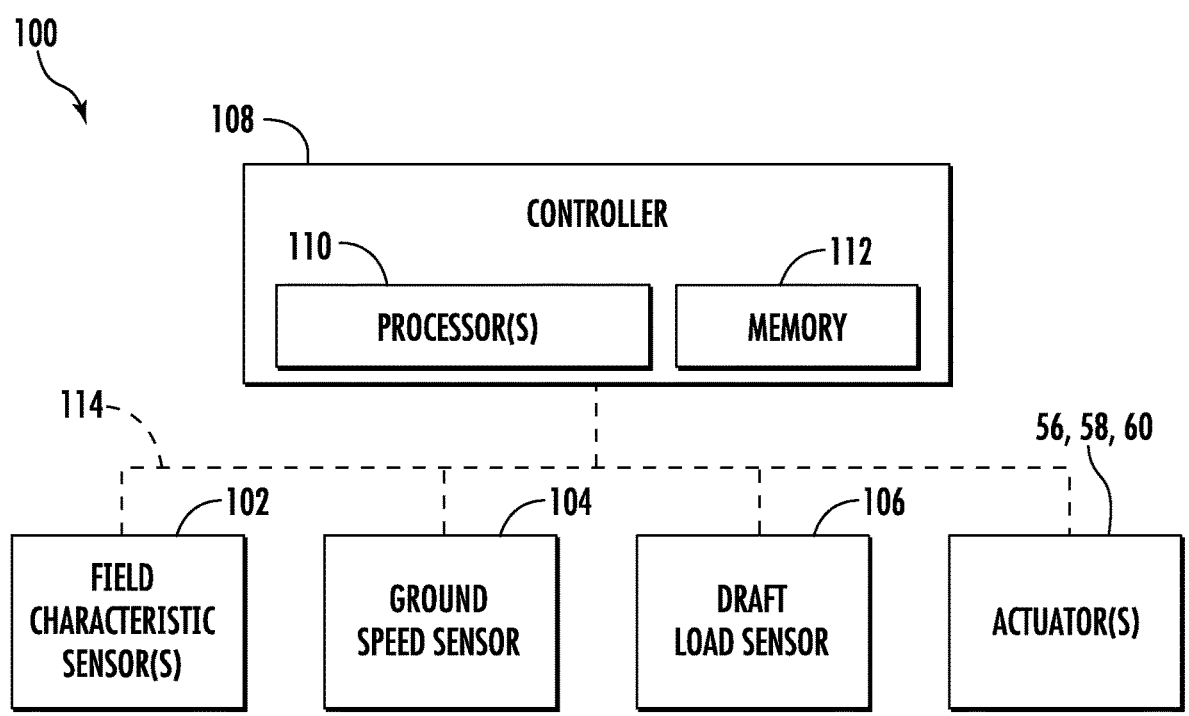
FIG. 3 illustrates a schematic view of one embodiment of a system for controlling the ground-engaging tools of an agricultural implement in accordance with aspects of the present subject matter.

Referring now to FIG. 3, a schematic view of one embodiment of a system 100 for controlling the ground-engaging tools of an agricultural implement is illustrated in accordance with aspects of the present subject matter. In general, the system 100 will be described herein with reference to the work vehicle 10 and the implement 12 described above with reference to FIGS. 1 and 2. However, it should be appreciated by those of ordinary skill in the art that the disclosed system 100 may generally be utilized with work vehicles having any other suitable vehicle configuration and/or implements having any other suitable implement configuration.

As shown in FIG. 3, the system 100 may include one or more field characteristic sensors 102 coupled to or otherwise mounted on the vehicle/implement 10/12. In general, the field characteristic sensor(s) 102 may correspond to any suitable device(s) configured to capture data indicative of the one or more field characteristics of the field across which the implement 12 is being towed by the vehicle 10. For instance, in several embodiments, the field characteristic sensor(s) 102 may correspond to a Light Detection and Ranging (LIDAR) device(s), such as a LIDAR scanner(s). In such embodiments, the field characteristic sensor(s) 102 may be configured to output light pulses from a light source (e.g., a laser outputting a pulsed laser beam) and detect the reflection of each pulse off the soil surface. Based on the time of flight of the light pulses, the specific location (e.g., 2-D or 3-D coordinates) of the soil surface relative to the field characteristic sensor(s) 102 may be calculated. By scanning the pulsed light over a given swath width, the profile of the soil surface may be detected across a given section of the field. Thus, by continuously scanning the pulsed light along the soil surface as the work vehicle 10 and the implement 12 are moved across the field, a plurality of data point scan lines may be generated. Such data point scan lines may, in turn, be indicative of one or more field characteristic(s) of the field, such as the residue coverage, soil clod size, soil levelness, and/or compaction layer location. Alternatively, the field characteristic sensor(s) 102 may correspond to any other suitable sensing device(s) capable of capturing data that allows one or more field characteristics of the field to be identified. For example, the field characteristic sensor(s) 102 may correspond to a camera(s), a radio detection and ranging (RADAR) sensor(s), an ultrasonic sensor(s), a mechanical or contact-based sensor(s), and/or the like.

Additionally, in several embodiments, the system 100 may include a ground speed sensor 104 provided in operative association with the vehicle 10 and/or the implement 12. In general, the ground speed sensor 104 may be configured to capture data indicative of the ground speed at which the vehicle/implement 10/12 travels across the field. For instance, in one embodiment, the ground speed sensor 104 may be configured as a Hall Effect sensor configured to detect the rotational speed of an output shaft of the transmission 24 of the vehicle 10. However, in alternative embodiments, the ground speed sensor 104 may be configured as any suitable device for sensing or detecting the ground speed of the vehicle/implement 10/12.

Furthermore, in several embodiments, the system 100 may include a draft load sensor 106 provided in operative association with the vehicle 10 and/or the implement 12. In general, as the vehicle/implement 10/12 travel across the field, the draft load sensor 106 may be configured to capture data indicative of the draft load applied to the vehicle 10 by the implement 12. For example, in one embodiment, the draft load sensor 106 may be configured as a load pin coupled between the hitch 32 of the implement 12 and the vehicle 10. However, in alternative embodiments, the draft load sensor 106 may be configured as any suitable device for sensing or detecting the draft load applied to the vehicle 10.

In accordance with aspects of the present subject matter, the system 100 may include a controller 108 positioned on and/or within or otherwise associated with the vehicle 10 or implement 12. In general, the controller 108 may comprise any suitable processor-based device known in the art, such as a computing device or any suitable combination of computing devices. Thus, in several embodiments, the controller 108 may include one or more processor(s) 110 and associated memory device(s) 112 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 112 of the controller 108 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 112 may generally be configured to store suitable computer-readable instructions that, when implemented by the processor(s) 110, configure the controller 108 to perform various computer-implemented functions.

In addition, the controller 108 may also include various other suitable components, such as a communications circuit or module, a network interface, one or more input/output channels, a data/control bus and/or the like, to allow controller 108 to be communicatively coupled to any of the various other system components described herein (e.g., the actuators 56, 58, 60 and the sensors 102, 104, 106). For instance, as shown in FIG. 3, a communicative link or interface 114 (e.g., a data bus) may be provided between the controller 108 and the components 56, 58, 60, 102, 104, 106 to allow the controller 108 to communicate with such components 56, 58, 60, 102, 104, 106 via any suitable communications protocol (e.g., CANBUS).

It should be appreciated that the controller 108 may correspond to an existing controller(s) of the vehicle 10 and/or the implement 12, itself, or the controller 108 may correspond to a separate processing device. For instance, in one embodiment, the controller 108 may form all or part of a separate plug-in module that may be installed in association with the vehicle 10 and/or the implement 12 to allow for the disclosed systems to be implemented without requiring additional software to be uploaded onto existing control devices of the vehicle 10 and/or the implement 12. It should also be appreciated that the functions of the controller 108 may be performed by a single processor-based device or may be distributed across any number of processor-based devices, in which instance such devices may be considered to form part of the controller 108. For instance, the functions of the controller 108 may be distributed across multiple application-specific controllers, such as an engine controller, a transmission controller, an implement controller, and/or the like.

In several embodiments, the controller 108 may be configured to determine a first value(s) of one or more field characteristics of the field across which the vehicle/implement 10/12 is traveling. As described above, the vehicle/implement 10/12 may include one or more field characteristic sensors 102, with each field characteristic sensor 102 configured to capture data indicative of one or more field characteristics of the field. In this respect, as the vehicle/implement 10/12 travels across the field, the controller 108 may be configured to receive data from the field characteristic sensor(s) 102 (e.g., via the communicative link 114). Thereafter, the controller 106 may be configured to process/analyze the received data to determine or estimate the first value(s) of the field characteristic(s) of the field at the current location of the vehicle/implement 10/12. For instance, the controller 108 may include a look-up table(s), suitable mathematical formula, and/or algorithms stored within its memory device(s) 112 that correlates the received data to the field characteristic(s) of the field.

The field characteristic(s) may correspond to correspond to any suitable parameter(s) or value(s) associated with the field conditions(s). For example, in several embodiments, the field characteristic(s) may correspond to the residue coverage (e.g., percent residue coverage), the soil levelness or profile, and/or the soil clod size (e.g., the soil clod size distribution) of the field. In another embodiment, the field characteristic(s) may correspond to the presence and/or location/depth of a soil compaction layer within the field, such as when the field characteristic sensor(s) 102 are configured as RADAR sensor(s). However, in alternative embodiments, the field characteristic(s) may correspond to any other suitable parameter(s)/value(s), such as the soil moisture content of the field.

Additionally, in several embodiments, the controller 108 may be configured to adjust one or more operating parameters of one or more first ground-engaging tools of the implement 12 based on the determined first value(s) of the field characteristic(s). In certain instances, the first value(s) of the field characteristic(s) may be too high or too low, thereby indicating that the operation of the implement 12 should be adjusted. As such, in one embodiment, the controller 108 may be configured to compare the determined first value(s) of the field characteristic(s) to a corresponding field characteristic value range. Thereafter, when the determined first value(s) fall outside of the corresponding range (thereby indicating the first value(s) of the field characteristic(s) may be too high or too low), the controller 108 may be configured to adjust one or more operating parameters of the first ground-engaging tool(s) of the implement 12. For example, in one embodiment, the controller 108 may be configured to transmit instructions to the actuator(s) associated with the first ground-engaging tool(s) instructing such actuator(s) to adjust the penetration depth of and/or the force being applied to the such tool(s).

Furthermore, after adjusting the operating parameter(s) of the first ground-engaging tool(s), the controller 108 may be configured to determine a second value(s) of the field characteristic(s) of the field across which the vehicle/implement 10/12 is traveling. More specifically, as described above, as the vehicle/implement 10/12 travels across the field, the controller 108 may be configured to receive data from the field characteristic sensor(s) 102 (e.g., via the communicative link 114). In this respect, after adjusting the operating parameter(s) of the first ground-engaging tool(s), the controller 106 may be configured to process/analyze newly received data from the field characteristic sensor(s) 102 to determine or estimate the second value(s) of the field characteristic(s) of the field at the current location of the vehicle/implement 10/12.

In accordance with aspects of the present subject matter, the controller 108 may be configured to adjust one or more operating parameters of one or more second ground-engaging tool(s) of the implement 12 based on the determined second value(s) of the field characteristic(s). More specifically, the adjustment(s) to the first ground-engaging tool(s) described above may cause the field characteristic values(s) to move back towards the corresponding range. However, in certain instances, the adjustment(s) to the first ground-engaging tool(s) may not cause the field characteristic value(s) to return to the corresponding range. Moreover, in such instances, further adjustments to the first ground-engaging tool(s) may not result in the field characteristic value(s) returning to the corresponding range. In fact, further adjustments may result in the field characteristic value(s) that are farther from the corresponding range. In this respect, after adjusting the first ground-engaging tool(s), the controller 108 may be configured to compare the determined second value(s) of the field characteristic(s) to the corresponding field characteristic value range. Thereafter, when the determined second value(s) fall outside of the corresponding range (thereby indicating the second value(s) of the field characteristic(s) may be too high or too low), the controller 108 may be configured to adjust one or more operating parameters of the second ground-engaging tool(s) of the implement 12. For example, in one embodiment, the controller 108 may be configured to transmit instructions to the actuator(s) associated with the second ground-engaging tool(s) instructing such actuator(s) to adjust the penetration depth of and/or the force being applied to the such tools.

The first and second ground-engaging tools of the implement 12 may correspond to any suitable tools configured to perform first and second operations, respectively, on the field as the vehicle/implement 10/12 travels across the field. For example, in one embodiment, the first ground-engaging tool(s) may correspond to the leveling blades 52 and the second ground engaging tool(s) may correspond to the shanks 46. More specifically, in such an embodiment, the controller 108 may be configured to determine a first value of the soil levelness or profile (e.g., the average amplitude of the soil profile) of the field. In general, the leveling blades 52 may generally have the greater impact on soil levelness/profile than the shanks 46. In this respect, when it determined that a first value of the soil levelness/profile has fallen out of a predetermined soil levelness range, the controller 108 may be configured to adjust one or more operating parameters of the leveling blades 52. For instance, the controller 108 may be configured to transmit instructions to the actuators 60 instructing such actuators 60 to adjust the penetration depth of and/or the force being applied to the such leveling blades 52. After adjusting the leveling blades 60, the controller 108 may be configured to determine a second value of the soil levelness/profile. When the when it determined that the second value of the soil levelness/profile has fallen outside of a predetermined soil levelness range (thereby indicating that the adjustments to the leveling blades 52 were unable to bring the soil levelness/profile back within the soil levelness/profile range), the controller 108 may be configured to adjust one or more operating parameters of the shanks 46. For instance, the controller 108 may be configured to transmit instructions to the actuators 56 instructing such actuators 56 to adjust the penetration depth of and/or the force being applied to the shanks 46. However, in alternative embodiments, the first ground-engaging tool(s) may correspond to any other suitable tool(s) of the implement 12 configured to perform a first operation on the field, such as the shanks 46, the disk blades 50, the basket assemblies 54, any closing disks (not shown), or any harrows (not shown). Similarly, the second ground-engaging tool(s) may correspond to any other suitable tool(s) of the implement 12 configured to perform a second operation on the field that is different from the first operation, such as the disk blades 50, leveling blades 52, the baskets 54, the closing disks, or the harrows. As such, the second ground-engaging tool(s) may be of a different type than the first ground-engaging tool(s).

In several embodiments, the controller 108 may be configured to adjust the first and second ground-engaging tools of the implement 12 based on other parameters or values in addition to the determined first and second field characteristic values, respectively. For example, in one embodiment, the controller 108 may be configured to adjust the first and second ground-engaging tools based on the ground speed of the vehicle/implement 10/12 in addition to the determined first and second field characteristic values, respectively. Specifically, as described above, the vehicle/implement 10/12 may include a ground speed sensor 104 configured to capture data indicative of the ground speed of the vehicle/implement 10/12. In this respect, as the vehicle/implement 10/12 travels across the field, the controller 108 may be configured to receive data from the ground speed sensor 104 (e.g., via the communicative link 114). Thereafter, the controller 106 may be configured to process/analyze the received data to determine or estimate the current ground speed of the vehicle/implement 10/12. For instance, the controller 108 may include a look-up table(s), suitable mathematical formula, and/or algorithms stored within its memory device(s) 112 that correlates the received data to the ground speed of the vehicle/implement 10/12. Based on the current ground speed of the vehicle/implement 10/12 in addition to the first value(s) of the field characteristic(s), the controller 108 may be configured to adjust the operating parameter(s) of the first and/or second ground-engaging tools as described above.

Moreover, in one embodiment, the controller 108 may be configured to adjust the first and second ground-engaging tools based on the draft load applied to the vehicle 10 by the implement 12 in addition to the determined first and second field characteristic values, respectively. Specifically, in such an embodiment, the vehicle/implement 10/12 may include a draft load sensor 106 configured to capture data indicative of the draft load applied to the vehicle 10 by the implement 12. In this respect, as the vehicle/implement 10/12 travels across the field, the controller 108 may be configured to receive data from the draft load sensor 106 (e.g., via the communicative link 114). Thereafter, the controller 106 may be configured to process/analyze the received data to determine or estimate the current draft load applied to the vehicle 10 by the implement 12. For instance, the controller 108 may include a look-up table(s), suitable mathematical formula, and/or algorithms stored within its memory device(s) 112 that correlates the received data to the draft load applied to the vehicle 10 by the implement 12. Based on the current draft load applied to the vehicle 10 by the implement 12 in addition to the first value(s) of the field characteristic(s), the controller 108 may be configured to adjust the operating parameter(s) of the first and/or second ground-engaging tools as described above.

Furthermore, after adjusting the first ground-engaging tool(s), the controller 108 may be configured to adjust one or more operating parameters of a third ground-engaging tool(s) of the implement 12. Specifically, in one embodiment, when it is determined that the second value(s) fall outside of the corresponding range (thereby indicating the second value(s) of the field characteristic(s) may be too high or too low), the controller 108 may be configured to adjust one or more operating parameters of the third ground-engaging tool(s) of the implement 12 in addition to adjusting the operating parameter(s) of the second ground-engaging tool(s). For example, in one embodiment, the controller 108 may be configured to transmit instructions to the actuator(s) associated with the third ground-engaging tool(s) instructing such actuator(s) to adjust the penetration depth of and/or the force being applied to the such tools. Moreover, the third ground-engaging tool(s) may correspond to any suitable tool(s) of the implement 12 configured to perform a third operation on the field that is different from the first and second operations, such as the shanks 46, the disk blades 50, leveling blades 52, or the baskets 54. As such, the third ground-engaging tool(s) may be of a different type than the first and second ground-engaging tools.

Additionally, in several embodiments, after adjusting the operating parameter(s) of the second ground-engaging tool(s), the controller 108 may be configured to determine a third value(s) of the field characteristic(s) of the field across which the vehicle/implement 10/12 is traveling. More specifically, as described above, as the vehicle/implement 10/12 travels across the field, the controller 108 may be configured to receive data from the field characteristic sensor(s) 102 (e.g., via the communicative link 114). In this respect, after adjusting the operating parameter(s) of the second ground-engaging tool(s), the controller 106 may be configured to process/analyze newly received data from the field characteristic sensor(s) 102 to determine or estimate the third value(s) of the field characteristic(s) of the field at the current location of the vehicle/implement 10/12.

Moreover, the controller 108 may be configured to adjust one or more operating parameters of a third ground-engaging tool(s) of the implement 12 based on the determined third value(s) of the field characteristic(s). More specifically, in certain instances, the adjustment(s) to the first and second ground-engaging tools may not cause the value(s) of the field characteristic(s) to return to the corresponding range. In this respect, after adjusting the second ground-engaging tool(s), the controller 108 may be configured to compare the determined third value(s) of the field characteristic(s) to the corresponding field characteristic value range. Thereafter, when the determined third value(s) fall outside of the corresponding range (thereby indicating the third value(s) of the field characteristic(s) may be too high or too low), the controller 108 may be configured to adjust one or more operating parameters of the third ground-engaging tool(s) of the implement 12. For example, in one embodiment, the controller 108 may be configured to transmit instructions to the actuator(s) associated with the third ground-engaging tool(s) instructing such actuator(s) to adjust the penetration depth of and/or the force being applied to the such tools.

It should be appreciated that the controller 108 may be configured to sequentially adjust any suitable number of ground-engaging tools or tool types supported on the implement 12 based on iteratively determined values of the field characteristics. For example, the after adjusting the third ground-engaging tool(s), the controller 108 may be configured to determine a fourth value(s) of the field characteristic(s) and adjust a fourth ground-engaging tool(s) of the implement 12 based on the determined fourth value(s) and so on.

In addition, the controller 108 may be configured to adjust the ground speed of the vehicle/implement 10/12 based on the determined third value(s) of the field characteristic(s). Specifically, in one embodiment, when the determined third value(s) fall outside of the corresponding range (thereby indicating the third value(s) of the field characteristic(s) may be too high or too low), the controller 108 may be configured to adjust the ground speed of the vehicle/implement 10/12. For example, in such an embodiment, the controller 108 may be configured to adjust the operation of the engine 22 and/or the transmission 24 in a manner that increases or decreases the ground speed of the vehicle 10 and, thus, the ground speed of the implement 12, such as by transmitting suitable instructions to an engine or speed governor (not shown) associated with the engine 22 and/or transmitting suitable instructions for controlling the engagement/disengagement of one or more clutches (not shown) provided in operative association with the transmission 24.

Figure 4:
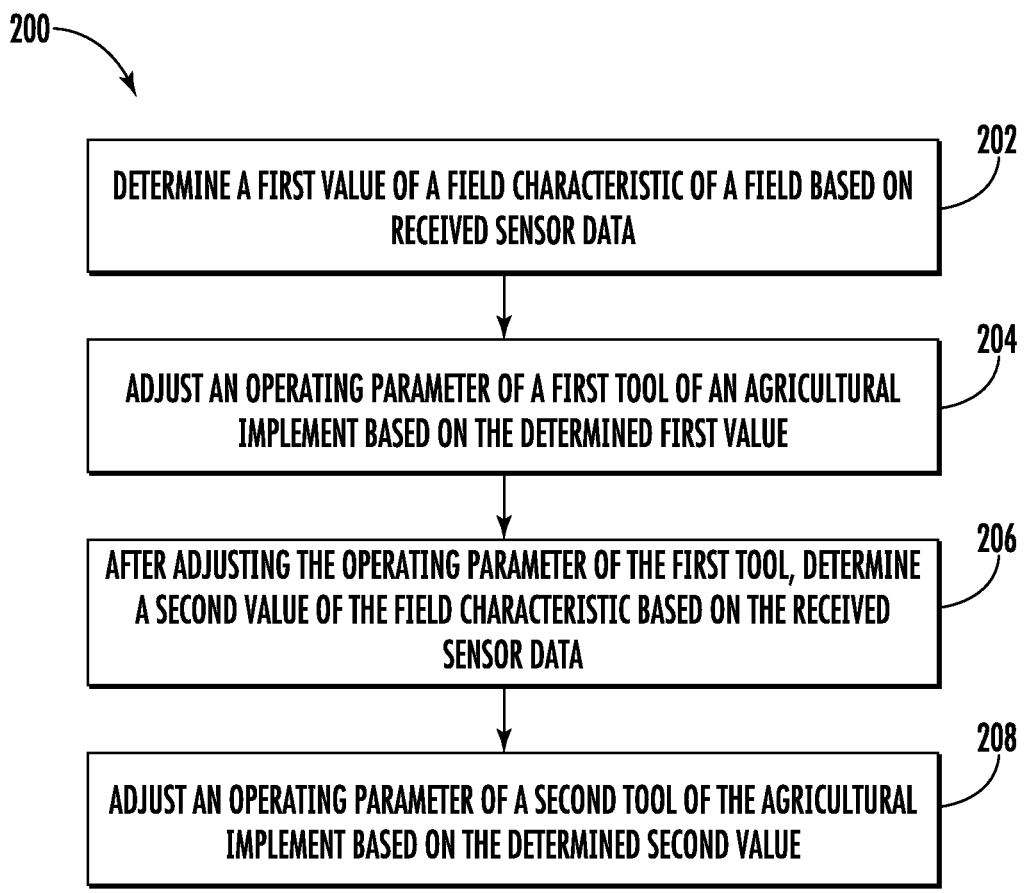
FIG. 4 illustrates a flow diagram of one embodiment of a method for controlling the ground-engaging tools of an agricultural implement in accordance with aspects of the present subject matter.

Referring now to FIG. 4, a flow diagram of one embodiment of a method 200 for controlling the ground-engaging tools of an agricultural implement is illustrated in accordance with aspects of the present subject matter. In general, the method 200 will be described herein with reference to the agricultural work vehicle 10 and implement 12 shown in FIGS. 1 and 2, as well as the various system components shown in FIG. 3. However, it should be appreciated that the disclosed method 200 may be implemented with work vehicles having any other suitable vehicle configuration, implements having any other suitable implement configuration, and/or within systems having any other suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include determining, with one or more computing devices, a first value of a field characteristic of a field based on received sensor data. For instance, as described above, the controller 108 may be configured to determine a first value(s) of one or more field characteristic(s) of a field based on data received from the field characteristic sensor(s) 102.

Additionally, at (204), the method 200 may include adjusting, with the one or more computing devices, an operating parameter of a first ground-engaging tool of an agricultural implement based on the determined first value. For instance, as described above, the controller 108 may be configured to adjust one or more operating parameters of a first ground-engaging tool(s) (e.g., the leveling blades 52) of the implement 12 based on the determined first value(s).

Moreover, as shown in FIG. 4, at (206), after adjusting the operating parameter of the first ground-engaging tool, the method 200 may include, determining, with the one or more computing devices, a second value of the field characteristic based on the received sensor data. For instance, as described above, after adjusting the operating parameter(s) of the first ground-engaging tool(s), the controller 108 may be configured to determine a second value(s) of the field characteristic(s) based on data newly received from the field characteristic sensor(s) 102.

Furthermore, at (208), the method 200 may include adjusting, with the one or more computing devices, an operating parameter of a second ground-engaging tool of the agricultural implement based on the determined second value. For instance, as described above, the controller 108 may be configured to adjust one or more operating parameters of a second ground-engaging tool(s) (e.g., the shanks 46) of the implement 12 based on the determined second value(s).

It is to be understood that the steps of the method 200 are performed by the controller 108 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 108 described herein, such as the method 200, is implemented in software code or instructions which are tangibly stored on a tangible computer readable medium. The controller 108 loads the software code or instructions via a direct interface with the computer readable medium or via a wired and/or wireless network. Upon loading and executing such software code or instructions by the controller 108, the controller 108 may perform any of the functionality of the controller 108 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling ground-engaging tools of an agricultural implement, the system comprising:
    a first ground-engaging tool configured to perform a first operation on a field as the agricultural implement is moved across the field;
    a second ground-engaging tool configured to perform a second operation on the field as the agricultural implement is moved across the field, the second ground-engaging tool being of a different type than the first ground-engaging tool;
    a sensor configured to capture data indicative of a field characteristic of the field; and
    a controller communicatively coupled to the sensor, the controller configured to:
        determine a first value of the field characteristic based on the data captured by the sensor;
        adjust an operating parameter of the first ground-engaging tool based on the determined first value;
        after adjusting the operating parameter of the first ground-engaging tool, determine a second value of the field characteristic based on the data captured by the sensor; and
        adjust an operating parameter of the second ground-engaging tool based on the determined second value.

2. The system of claim 1, further comprising:
    a third tool configured to engage the soil as the agricultural implement is moved across the field, the controller being further configured to:
    after adjusting the operating parameter of the first ground-engaging tool, adjust an operating parameter of the third tool based on the determined second value of the field characteristic.

3. The system of claim 1, further comprising:
    a third tool configured to engage the soil as the agricultural implement is moved across the field, the controller being further configured to:
    after adjusting the operating parameter of the second ground-engaging tool, determine a third value of the field characteristic based on the data captured by the sensor; and
    adjust an operating parameter of the third tool based on the determined third value of the field characteristic.

4. The system of claim 1, wherein the controller is further configured to:
    adjust the operating parameter of the first ground-engaging tool based on a ground speed of the agricultural implement in addition to the determined first value of the field characteristic; and
    adjust the operating parameter of the second ground-engaging tool based on the ground speed of the agricultural implement in addition to the determined second value of the field characteristic.

5. The system of claim 1, wherein the controller is further configured to:
    adjust the operating parameter of the first ground-engaging tool based on a draft load applied to a work vehicle by the agricultural implement in addition to the determined first value of the field characteristic; and
    adjust the operating parameter of the second ground-engaging tool based on the draft load in addition to the determined second value of the field characteristic.

6. The system of claim 1, wherein the controller is further configured to:
    after adjusting the operating parameter of the second ground-engaging tool, determine a third value of the field characteristic based on the data captured by the sensor; and
    adjust a ground speed of the agricultural implement based on the determined third value of the field characteristic.

7. The system of claim 1, wherein the first ground-engaging tool comprises one of a disk, a leveling blade, a shank, or a basket and the second ground-engaging tool comprises another of the disk, the leveling blade, the shank, or the basket.

8. The system of claim 1, wherein the first ground-engaging tool comprises a leveling blade and the second ground-engaging tool comprises one of a disk or a shank.

9. The system of claim 1, wherein the field characteristic comprises at least one of residue coverage, soil clod size, soil levelness, or compaction layer depth.

10. A method for controlling ground-engaging tools of an agricultural implement, the agricultural implement including a first ground-engaging tool configured to perform a first operation on a field as the agricultural implement is moved across the field, the agricultural implement further including a second ground-engaging tool configured to perform a second operation on the field as the agricultural implement is moved across the field, the second ground-engaging tool being of a different type than the first ground-engaging tool, the method comprising:
    determining, with one or more computing devices, a first value of a field characteristic of the field based on received sensor data;
    adjusting, with the one or more computing devices, an operating parameter of the first ground-engaging tool based on the determined first value;
    after adjusting the operating parameter of the first ground-engaging tool, determining, with the one or more computing devices, a second value of the field characteristic based on the received sensor data; and adjusting, with the one or more computing devices, an operating parameter of the second ground-engaging tool based on the determined second value.

11. The method of claim 10, wherein the agricultural implement further includes a third tool configured to engage the soil as the agricultural implement is moved across the field, the method further comprising:
after adjusting the operating parameter of the first ground-engaging tool, adjusting, with the one or more computing devices, an operating parameter of the third tool based on the determined second value of the field characteristic.

12. The method of claim 10, wherein the agricultural implement further includes a third tool configured to engage the soil as the agricultural implement is moved across the field, the method further comprising:
after adjusting the operating parameter of the second ground-engaging tool, determining, with the one or more computing devices, a third value of the field characteristic based on the received sensor data; and
adjusting, with the one or more computing devices, an operating parameter of the third tool based on the determined third value of the field characteristic.

13. The method of claim 10, further comprising:
adjusting, with the one or more computing devices, the operating parameter of the first ground-engaging tool based on a ground speed of the agricultural implement in addition to the determined first value of the field characteristic; and
adjusting, with the one or more computing devices, the operating parameter of the second ground-engaging tool based on the ground speed of the agricultural implement in addition to the determined second value of the field characteristic.

14. The method of claim 10, further comprising:
adjusting, with the one or more computing devices, the operating parameter of the first ground-engaging tool based on a draft load applied to a work vehicle by the agricultural implement in addition to the determined first value of the field characteristic; and
adjusting, with the one or more computing devices, the operating parameter of the second ground-engaging tool based on the draft load in addition to the determined second value of the field characteristic.

15. The method of claim 10, further comprising:
after adjusting the operating parameter of the second ground-engaging tool, determining, with the one or more computing devices, a third value of the field characteristic based on the received sensor data; and
adjusting, with the one or more computing devices, a ground speed of the agricultural implement based on the determined third value of the field characteristic.

16. The method of claim 10, wherein the first ground-engaging tool comprises one of a disk, a leveling blade, or a shank and the second ground-engaging tool comprises another of the disk, the leveling blade, or the shank.

17. The method of claim 10, wherein the first ground-engaging tool comprises a leveling blade and the second ground-engaging tool comprises one of a disk or a shank.

18. The method of claim 10, wherein the field characteristic comprises at least one of residue coverage, soil clod size, soil levelness, or compaction layer depth.

* * * * *